(No Model.)
F. J. REINHOLD.
CAPSULE FILLER.
No. 302,777. Patented July 29, 1884.
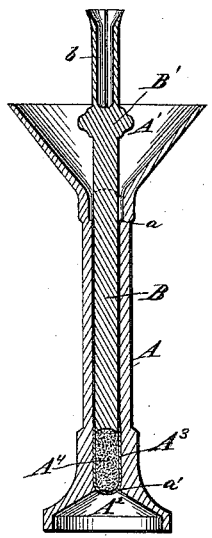
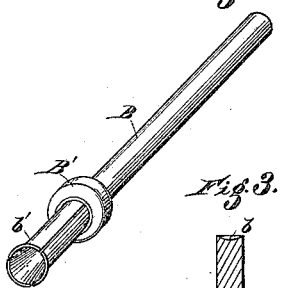
Attest,
Jno. E. Wiles.
N. S. Wright.
Inventor,
Frank J. Reinhold
By W. W. Leggett,
Attorney

UNITED STATES PATENT OFFICE.

FRANK J. REINHOLD, OF DETROIT, MICHIGAN, ASSIGNOR TO FREDERICK A. HUBEL.

CAPSULE-FILLER.

SPECIFICATION forming part of Letters Patent No. 302,777, dated July 29, 1884.

Application filed December 10, 1883. (No model.)

*To all whom it may concern:*

Be it known that I, FRANK J. REINHOLD, of Detroit, county of Wayne, State of Michigan, have invented a new and useful Improvement in Capsule-Fillers; and I do hereby declare the following to be a full, clear, and exact description of the same, such as will enable others skilled in the art to which it pertains to make and use it, reference being had to the accompanying drawings, which form a part of this specification.

My invention consists of the devices and appliances hereinafter specified, and more particularly pointed out in the claims.

In the drawings, Figure 1 is a vertical section of a device embodying my invention. Fig. 2 is a perspective view of portions thereof. Fig. 3 is a longitudinal section of the same.

My invention relates to capsule-fillers, and has for its object especially a filler consisting of a tube provided with interior shoulders and one or more funnels, and the construction of a plunger to be used in connection therewith.

I carry out my invention as follows: In the drawings, A represents the tube constructed with interior shoulders, $a$ and $a'$, suitably located therein. Said tube is also provided with funnels $A'$ and $A^2$.

B is the plunger, preferably concaved upon one end, as shown in Fig. 3 at $b$. Said plunger at the other end is provided with a thimble, $b'$, of any suitable construction. I also prefer to provide said plunger with a stop, $B'$, located at a suitable distance from the extremities. In the drawings the thimble is shown with longitudinal slots cut therein, giving to the various parts of the thimble a suitable degree of elasticity, said thimble being adapted to readily engage the cap of the capsule. The orifice of the tube is adapted to receive the body of the capsule and to permit its readily descending therein to the shoulders $a'$, upon which the capsule when inserted will rest. The upper end of said tube is of a size sufficient to receive the cap of the capsule, and the shoulder $a$ is adapted to receive the cap, the upper end of which may rest thereon when inserted in place.

The operation of the device is as follows: The body of the capsule $A^3$ is first inserted in the tube, with its upper end extending toward the funnel $A'$. The ingredient $A^4$ is then placed in said funnel, and descends through the tube into the capsule, which may now be suitably packed in the capsule by inserting the concave end of the plunger. This being done, the cap of the capsule is inserted, its open end downward, in the funnel $A'$. The tube may then be reversed in position, and by means of the concave end of the plunger the capsule may be forced downward in the tube and engaged with the cap. The cap may readily be prevented from displacement by inserting the finger into the funnel adjacent thereto with suitable pressure, when by a farther insertion of the plunger the capsule, with the cap secured thereto, may be forced from the tube. Experience will enable the operator to cap the capsule and to force it from the tube by a continuous pressure upon the plunger.

By constructing the thimble of the plunger as described a cap may be readily picked up therewith and be inserted thereby into the funnel, as described, without the necessity of handling the cap with the fingers. This mechanism affords a simple, economical, ready, and efficient means for filling capsules. The funnel at the lower end of the tube is not indispensable, as the device might be employed without it; but it forms a convenient base upon which the tube may rest, and also renders it more convenient of operation. I desire to construct the tubes either with or without said funnel at the base.

I do not limit myself to any particular location of the shoulders $a$ and $a'$ in the tube, as they may be situated in any desired location.

The stop $B'$ may either be rigid or movable, as may be desired.

What I claim is—

1. The tube A, constructed with interior shoulders, $a\ a'$, said tube provided with funnels $A'$ and $A^2$, substantially as described.

2. A plunger, B, concave at one end and provided with a thimble at the opposite end, substantially as described.

3. The plunger B, concave at one end and provided with a thimble at the other, said plunger provided with a suitable stop, B', substantially as described.

4. The tube A, provided with interior shoulders, a and a', and a funnel, A', and, in combination therewith, a suitable plunger, substantially as described.

5. The tube A, provided with a shoulder at one end, adapted to form a bearing for the body of the capsule, and a shoulder at the opposite end, adapted to form a bearing for the cap of the capsule, and, in combination therewith, a plunger adapted to be inserted into either end of the tube, substantially as and for the purposes specified.

In testimony whereof I sign this specification in the presence of two witnesses.

FRANK J. REINHOLD.

Witnesses:
 N. S. WRIGHT,
 M. B. O'DOGHERTY.